(12) United States Patent
Fraenk

(10) Patent No.: US 10,767,764 B2
(45) Date of Patent: Sep. 8, 2020

(54) TURBOCHARGER

(71) Applicant: Bayerische Motoren Werke Aktiengesellschaft, Munich (DE)

(72) Inventor: Manfred Fraenk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 389 days.

(21) Appl. No.: 15/680,892

(22) Filed: Aug. 18, 2017

(65) Prior Publication Data

US 2017/0343116 A1    Nov. 30, 2017

Related U.S. Application Data

(63) Continuation of application No. PCT/EP2016/051483, filed on Jan. 26, 2016.

(30) Foreign Application Priority Data

Mar. 19, 2015    (DE) .......................... 10 2015 205 033

(51) Int. Cl.
*F02B 33/44*    (2006.01)
*F16K 1/42*    (2006.01)
*F01D 17/10*    (2006.01)
*F02B 37/18*    (2006.01)
(Continued)

(52) U.S. Cl.
CPC ............ *F16K 1/427* (2013.01); *F01D 17/105* (2013.01); *F02B 37/183* (2013.01); *F02C 6/12* (2013.01); *F02C 7/20* (2013.01); *F05D 2220/40* (2013.01); *F05D 2230/60* (2013.01); *F05D 2260/30* (2013.01); *F05D 2260/36* (2013.01); *F05D 2300/501* (2013.01); *Y02T 10/144* (2013.01)

(58) Field of Classification Search
CPC ........ F01D 17/105; F02B 37/183; F02C 6/12; F05D 2220/40; F05D 2230/60; F05D 2260/30; F05D 2260/36; F05D 2300/501; F16K 1/427; Y02T 10/144
See application file for complete search history.

(56) References Cited

U.S. PATENT DOCUMENTS 4,245,953 A * 1/1981 Milton .................. F01D 17/105
                                                            415/144
4,457,376 A * 7/1984 Carmody ................ E21B 34/10
                                                            166/332.8
(Continued)

FOREIGN PATENT DOCUMENTS

DE        966 935        9/1957
DE        21 65 885 A1   7/1973
(Continued)

OTHER PUBLICATIONS

International Search Report (PCT/ISA/210) issued in PCT Application No. PCT/EP2016/051483 dated Apr. 29, 2016 with English translation (five pages).
(Continued)

*Primary Examiner* — George C Jin
*Assistant Examiner* — Teuta B Holbrook
(74) *Attorney, Agent, or Firm* — Crowell & Moring LLP

(57)    ABSTRACT

A turbocharger for a motor vehicle has a housing and a valve seat in the housing. The valve seat is retained in an interlocking manner in the housing by at least one elastic securing element.

12 Claims, 2 Drawing Sheets

(51) Int. Cl.
*F02C 6/12* (2006.01)
*F02C 7/20* (2006.01)

(56) References Cited

U.S. PATENT DOCUMENTS

| | | | | |
|---|---|---|---|---|
| 5,735,468 A * | 4/1998 | Casey | ............... | B05B 7/0466 |
| | | | | 239/425 |
| 6,052,995 A * | 4/2000 | Krimmer | ............... | F02B 37/16 |
| | | | | 123/564 |
| 7,637,106 B2 * | 12/2009 | Hertweck | ............... | F02B 37/025 |
| | | | | 137/625.47 |
| 2007/0169479 A1 * | 7/2007 | Nicolle | ............... | F02B 37/18 |
| | | | | 60/612 |
| 2007/0240676 A1 * | 10/2007 | Sasaki | ............... | F02D 9/04 |
| | | | | 123/337 |
| 2009/0064678 A1 * | 3/2009 | Perrin | ............... | F16K 3/246 |
| | | | | 60/602 |
| 2011/0103936 A1 * | 5/2011 | Lombard | ............... | F01D 9/026 |
| | | | | 415/145 |
| 2011/0268559 A1 * | 11/2011 | Lombard | ............... | F01D 17/105 |
| | | | | 415/145 |
| 2012/0201655 A1 * | 8/2012 | Kusakabe | ............... | F04D 29/5853 |
| | | | | 415/116 |
| 2013/0251512 A1 * | 9/2013 | Lombard | ............... | F02B 37/183 |
| | | | | 415/125 |
| 2014/0353538 A1 * | 12/2014 | Jeanson | ............... | F02B 37/004 |
| | | | | 251/364 |
| 2015/0315963 A1 * | 11/2015 | Graichen | ............... | F16K 31/0648 |
| | | | | 415/148 |
| 2016/0032818 A1 * | 2/2016 | Mallett | ............... | F02B 37/186 |
| | | | | 251/318 |
| 2016/0153351 A1 * | 6/2016 | Turner | ............... | F02B 33/32 |
| | | | | 60/600 |
| 2016/0178105 A1 * | 6/2016 | McHenry | ............... | F02B 33/40 |
| | | | | 285/41 |
| 2016/0356250 A1 * | 12/2016 | Fletcher | ............... | F02M 35/10275 |
| 2018/0023460 A1 * | 1/2018 | Mawer | ............... | F02B 37/183 |
| | | | | 251/304 |

FOREIGN PATENT DOCUMENTS

| | | | |
|---|---|---|---|
| DE | 38 39 968 A1 | 5/1990 | |
| DE | 19727141 C1 * | 8/1998 | ............ F02B 37/183 |
| DE | 10 2010 013 702 A1 | 10/2011 | |
| DE | 10 2011 054 354 A1 | 4/2013 | |
| DE | 10 2013 209 717 A1 | 11/2014 | |
| WO | WO 2014/160594 A1 | 10/2014 | |

OTHER PUBLICATIONS

German-language Written Opinion (PCT/ISA/237) issued in PCT Application No. PCT/EP2016/051483 dated Apr. 29, 2016 (six pages).

German Search Report issued in counterpart German Application No. 10 2015 205 033.5 dated Nov. 9, 2015 with partial English translation (12 pages).

* cited by examiner

TURBOCHARGER

CROSS REFERENCE TO RELATED APPLICATIONS

This application is a continuation of PCT International Application No. PCT/EP2016/051483, filed Jan. 26, 2016, which claims priority under 35 U.S.C. § 119 from German Patent Application No. 10 2015 205 033.5, filed Mar. 19, 2015, the entire disclosures of which are herein expressly incorporated by reference.

BACKGROUND AND SUMMARY OF THE INVENTION

The invention relates to a turbocharger for a motor vehicle, having a housing as well as a valve seat arranged in the housing.

Turbochargers are commonly used in the automotive field and serve to compress the fresh air delivered to an internal combustion engine according to a known principle. A corresponding turbocharger often has a so-called bypass or bypass channel by which the exhaust gas stream channeled through the turbine of the turbocharger can be controlled by taking a portion of the exhaust gas stream through the bypass channel and past the turbine when necessary. The control of the exhaust gas stream is typically done with the aid of a valve arranged in the bypass channel, the so-called waste gate valve, whose position can be dictated, and the partial exhaust gas stream flowing through the bypass channel can be determined. Such a turbocharger design is described, for example, in DE 10 2010 013 702 A1.

Starting from this, the problem which the invention proposes to solve is to provide an advantageously designed turbocharger as well as a method of manufacturing same.

This problem is solved by a turbocharger, as well as a method of manufacturing same, for a motor vehicle, comprising a housing as well as a valve seat arranged in the housing. The valve seat is held in the housing in an interlocking manner by at least one elastic securing element.

The benefits cited in regard to the turbocharger and preferred embodiments can also be transferred accordingly to the method and vice versa.

A corresponding turbocharger is designed for the automotive field and comprises a housing as well as a valve seat arranged in the housing. The valve seat is designed here as a separate element, a prefabricated component or prefabricated subassembly, and it is held in the housing in an interlocking manner by way of at least one elastic securing element.

A turbocharger with this design offers, among other things, the advantage that the valve seat can be replaced when necessary, i.e., when it becomes worn, for example. This is therefore especially advantageous since the valve seat serves primarily as a sealing element which is subject to a certain wear and tear, having unfavorable effects on the effectiveness of the turbocharger.

Thanks to the fastening of the valve seat by way of an elastic securing element, the valve seat is in turn securely held in its position in the housing of the turbocharger on the one hand, and on the other hand the installation of the valve seat in the housing is relatively simple. The fastening solution is, in particular, also very heat resistant and accordingly the fastening is not impaired by the temperatures occurring during the operation of the turbocharger, such as is the case for example with a fastening of the valve seat by way of a press fitting.

Advisedly, the interlocking connection is further designed with the aid of the elastic securing element so that the securing element or spring element is tensioned for the connecting of valve seat and housing and after being positioned in the housing it is at least partly relaxed. The at least partial relaxation occurs advantageously automatically as soon as the valve seat has reached its intended position in the housing, so that the mounting or the installing of the valve seat is easier.

According to one variant embodiment, the elastic securing element in the at least partly relaxed state protrudes further into a material recess in the housing so that a kind of tongue and groove joint is realized by the elastic securing element and the material recess, which is formed when the valve seat has reached the intended position in the housing of the turbocharger in the course of a mounting process.

Alternatively or additionally, a material recess is formed on the sleeve body into which the elastic securing element protrudes in an analogous manner, so that a tongue and groove type joint or connection is realized by means of the elastic securing element and the material recess or material recesses.

Further preferably, the valve seat is ring or sleeve shaped and, furthermore preferably, at least one of the material recesses is formed as an encircling groove and thus as an annular material recess. Such material recesses can be realized rather easily and can be worked into the housing or the annular body or sleeve body of the valve seat by milling, for example.

In particular, if the material recess in the housing and/or the material recess of the valve seat is/are ring shaped, it is further advantageous for the elastic securing element to be configured as a spring element in the manner of a snap ring. In this way, the elastic securing element can be positioned in an easy manner on the ring body or on the sleeve body of the valve seat or in the housing. The elastic securing element is subsequently held on the ring body or on the sleeve body of the valve seat or in the housing, which again is beneficial for an easy assembly.

Furthermore, it is advantageous for the housing of the turbocharger to be designed such that it has an end stop, especially an annular end stop, for the valve seat, against which the valve seat presses in the mounted state, for example, by one end face. In the course of the installation of the valve seat, the valve seat is then inserted with the tensioned elastic securing element in the bypass channel for example and pushed in the direction of the intended position until it reaches the intended position and thus the end stop, whereupon the tensioned elastic securing element relaxes in the material recess supplementing the elastic securing element and becomes interlocked with it.

Advisedly, the valve, which is preferably given by a valve flap, is then introduced from the same direction into the bypass channel and moved in the direction of the valve seat until it reaches the valve seat and thus the intended position.

Other objects, advantages and novel features of the present invention will become apparent from the following detailed description of one or more preferred embodiments when considered in conjunction with the accompanying drawings.

DETAILED DESCRIPTION OF THE DRAWINGS

Parts corresponding to each other are respectively given the same reference numbers in all the figures.

Figure 1:
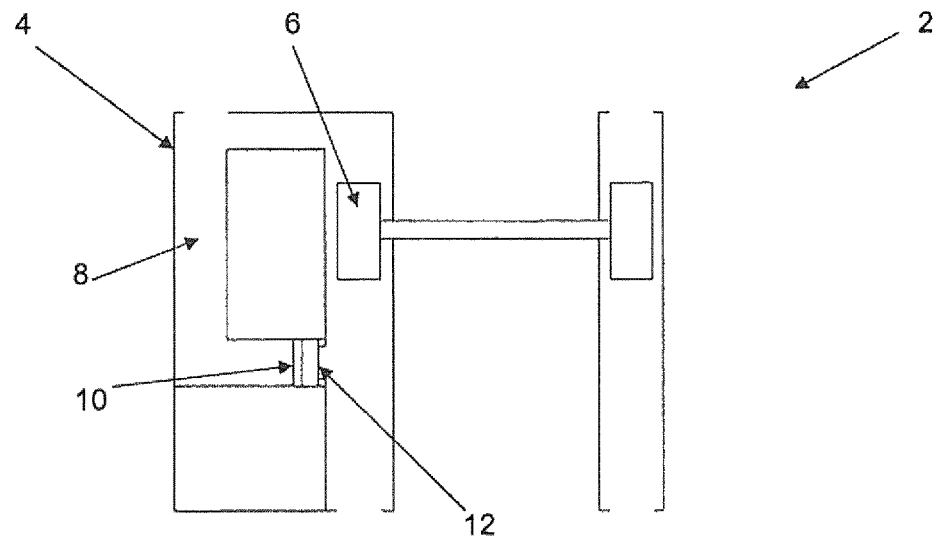
FIG. 1 is a cross-sectional representation of a turbocharger with a turbine housing and a valve seat.
Figure 2:
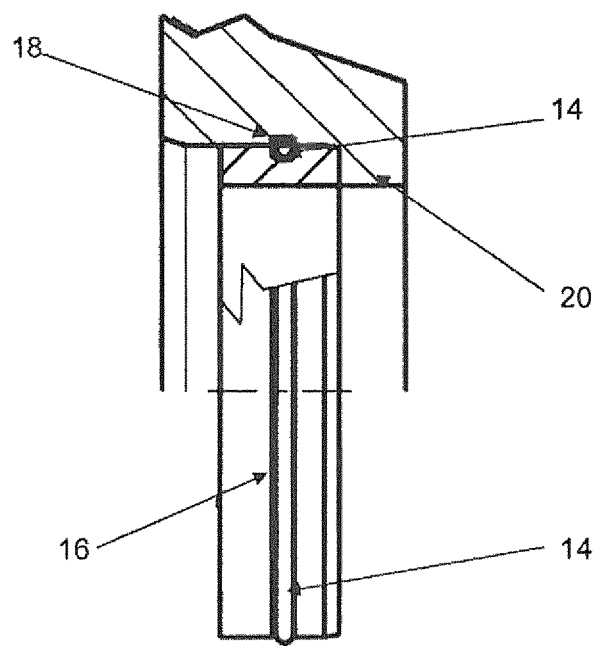
FIG. 2 is an enlarged cross-sectional representation of a portion of the turbine housing and the valve seat.
Figure 3:
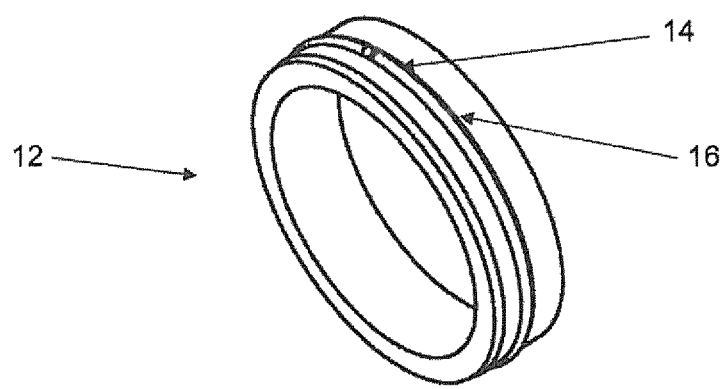
FIG. 3 is a perspective view of the valve seat.

A subsequently described example of a turbocharger 2 sketched in FIG. 1 is part of an internal combustion engine of a motor vehicle, not further shown, and accordingly it is installed in a motor vehicle.

The turbocharger 2 includes a turbine housing 4, in which a turbine 6 is arranged. An exhaust gas stream from the internal combustion engine is flows across this turbine 6 during the operation of the turbocharger 2, so that the turbine 6 and thus ultimately the turbocharger 2 is driven.

In order to control the rotary speed of the turbine 6, the exhaust gas stream flowing across the turbine 6 is regulated by conducting a variably adjustable partial exhaust gas stream past the turbine 6 through a bypass channel 8. The partial exhaust gas stream flowing across the bypass channel 8 is regulated with the aid of a valve 10, which is designed as a valve flap and closes the bypass channel 8 in a servo position. Likewise in this servo position, the valve 10 lies against a valve seat 12, which is held as a separate component in the turbine housing 4 and designed as an annular sealing element.

The valve seat 12, designed in the manner of a seat ring, is secured with the aid of a snap ring 14, which lies in an encircling annular groove 16 on the valve seat 12 and protrudes into or engages with an annular detent groove 18 in the turbine housing 4. In the course of the installation, during which the prefabricated subassembly made up of valve seat 12 and snap ring 14 is inserted into the turbine housing 4, at first the snap ring 14 is tensioned by compression and in this state the subassembly is introduced into the bypass channel 8 of the turbine housing 4.

After this, the subassembly made up of valve seat 12 and snap ring 14 is pushed in the direction of an annular end stop 20, until it reaches its intended end position and presses by its end face against the end stop 20, by which the snap ring 14 expands into the detent groove 18 in the turbine housing 4 and becomes relaxed. In this way, the subassembly made up of valve seat 12 and snap ring 14 locks in the intended position and the valve seat 12 is thereafter held interlockingly in the turbine housing 4.

Once the valve seat 12 has been positioned in the turbine housing 4, the valve 10 is then introduced into the bypass channel 8 and pushed in the direction of the valve seat 12, until it rests by its end face against the valve seat 12 and closes the bypass channel 8. With the use of a servo mechanism, not further represented, the valve 10 can be shifted in the bypass channel 8 in the turbine housing 4 of the turbocharger 2, i.e., moved away from the valve seat 12, whereby a portion of the exhaust gas stream can be diverted past the turbine 6 through the bypass channel 8.

The invention is not limited to the above described sample embodiment. Instead, other variants of the invention can be derived from it by a person skilled in the art, without leaving the subject matter of the invention. In particular, moreover, all individual features described in connection with the sample embodiment can also be otherwise combined with each other, without leaving the subject matter of the invention.

LIST OF REFERENCE SYMBOLS 2 turbocharger
4 turbine housing
6 turbine
8 bypass channel
10 valve
12 valve seat
14 snap ring
16 annular groove
18 detent groove
20 end stop The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A turbocharger for a motor vehicle, comprising:
a housing;
a valve seat arranged in the housing; and
at least one elastic securing element by which the valve seat is held in the housing in an interlocking connection.

2. The turbocharger according to claim 1, wherein
the interlocking connection between the housing and the valve seat is configured via the elastic securing element so that the elastic securing element is tensioned before forming the interlocking connection of the valve seat and the housing and has the tension at least partly relaxed after forming the interlocking connection.

3. The turbocharger according to claim 2, wherein
the elastic securing element protrudes into a material recess in the housing.

4. The turbocharger according to claim 3, wherein the material recess is ring shaped.

5. The turbocharger according to claim 3, wherein the elastic securing element is a snap ring.

6. The turbocharger according to claim 2, wherein
the elastic securing element protrudes into a material recess on the valve seat.

7. The turbocharger according to claim 6, wherein the material recess is ring shaped.

8. The turbocharger according to claim 6, wherein the elastic securing is a snap ring.

9. The turbocharger according to claim 2, wherein the elastic securing element is a snap ring.

10. The turbocharger according to claim 1, wherein
the housing has an annular end stop against which an end face of the valve seat presses.

11. The turbocharger according to claim 1, further comprising:
a bypass channel in the housing, wherein
the valve seat is arranged in the bypass channel.

12. A method of manufacturing a turbocharger having a housing and a valve seat arranged in the housing, the method comprising the acts of:
providing the valve seat with an elastic securing element, the elastic securing element being tensioned for connecting the valve seat and the housing;
introducing the valve seat having the tensioned elastic securing element into the housing, wherein the elastic securing element at least partly relaxes the tension as soon as the valve seat reaches an end installation position in the housing.

\* \* \* \* \*